United States Patent
Gopalakrishnan et al.

(10) Patent No.: US 9,200,516 B2
(45) Date of Patent: Dec. 1, 2015

(54) TURBOMACHINE ROTOR HAVING DOVETAIL SLOT AND METHOD OF MACHINING

(75) Inventors: Mahesh Gopalakrishnan, Bangalore (IN); Michael Ericson Friedman, Simpsonville, SC (US); Mark Alan Newton, Greenville, SC (US); Roberto Anthony Nunez, Greenville, SC (US); Yong Soon Phua, Sembawang (SG); Premkumar Rajamohan, Bangalore (IN)

(73) Assignee: General Electric Company, Schenectady, NY (US)

( * ) Notice: Subject to any disclaimer, the term of this patent is extended or adjusted under 35 U.S.C. 154(b) by 702 days.

(21) Appl. No.: 13/593,629

(22) Filed: Aug. 24, 2012

(65) Prior Publication Data

US 2014/0056714 A1    Feb. 27, 2014

(51) Int. Cl.
*F01D 5/00*     (2006.01)
*B23P 6/00*     (2006.01)
*F01D 5/02*     (2006.01)

(52) U.S. Cl.
CPC .............. *F01D 5/005* (2013.01); *B23P 6/002* (2013.01); *F01D 5/025* (2013.01); *B23C 2220/366* (2013.01); *Y10T 29/49318* (2015.01)

(58) Field of Classification Search
CPC ...... F01D 5/3015; F01D 5/326; B23P 15/006
USPC ........................................................ 416/239
See application file for complete search history.

(56) References Cited

U.S. PATENT DOCUMENTS

| | | | | |
|---|---|---|---|---|
| 5,141,401 A | * | 8/1992 | Juenger et al. | 416/219 R |
| 5,277,548 A | * | 1/1994 | Klein et al. | 416/193 A |
| 6,929,434 B2 | * | 8/2005 | Prokop | 408/230 |
| 7,007,382 B2 | * | 3/2006 | Mantel | 29/889.2 |
| 7,845,076 B2 | | 12/2010 | Beckford et al. | |

* cited by examiner

*Primary Examiner* — Nathaniel Wiehe
*Assistant Examiner* — Michael Sehn
(74) *Attorney, Agent, or Firm* — Ernest G. Cusick; Hoffman Warnick LLC

(57) ABSTRACT

Various embodiments include a rotor having a dovetail slot with a bulbous fillet region, and in some cases, recessed inclined bearing surfaces. Various embodiments include methods of forming such a slot in a turbomachine rotor.

14 Claims, 4 Drawing Sheets

TURBOMACHINE ROTOR HAVING DOVETAIL SLOT AND METHOD OF MACHINING

FIELD OF THE INVENTION

The subject matter disclosed herein relates to turbomachines (e.g., turbines). More particularly, the subject matter relates to turbomachines such as gas turbines, and systems utilizing a turbomachine.

BACKGROUND OF THE INVENTION

Conventional approaches for maintaining (e.g., repairing, refurbishing or otherwise machining) turbomachines (e.g., gas turbines, blowers, etc.) are deficient. Turbomachines include a rotor and a stator each with associated components which are used to translate the fluid motion of a gas into the rotary motion of the turbine's shaft. The rotor includes a rotor body (also referred to as a rotor wheel) surrounding the shaft, and a plurality of blades extending radially from the wheel.

During its operational lifetime, turbine rotors (along with other components) may be repaired and/or refurbished. Sometimes, repair/refurbishment involves removing blades from the rotor wheel, and replacing those blades with either rehabilitated or altogether new blades. However, during repair/refurbishment of blades, the rotor wheel can become damaged, and in some cases, is discarded. No current approach exists for preventing or remedying this damage.

BRIEF DESCRIPTION OF THE INVENTION

Various embodiments include a turbomachine rotor and methods of machining. Various particular embodiments include a rotor having a dovetail slot with a bulbous fillet region and recessed inclined bearing surfaces (or, pressure faces). In some embodiments, a turbomachine rotor includes: a rotor body; and at least one dovetail slot within the rotor body, the at least one dovetail slot for receiving a dovetail section of a rotor blade, the at least one dovetail slot including: a pair of opposing, vertically aligned surfaces defining a radial opening; a pair of inclined bearing surfaces each continuous with one of the pair of opposing vertically aligned surfaces; a substantially planar inner surface opposing the radial opening; and a pair of bulbous surfaces each continuous with an end of the substantially planar inner surface and an end of one of the pair of inclined bearing surfaces, the pair of bulbous surfaces each having: a first section proximate the one of the pair of inclined bearing surfaces; and a second section continuous with the first section, the first section located a first distance from a middle point on a first reference line connecting the end of the one of the pair of inclined bearing surfaces and the end of the substantially planar inner surface, and the second section located a second distance from the middle point on the first reference line, the first distance being larger than the second distance.

A first aspect of the invention includes a turbomachine rotor having: a rotor body; and at least one dovetail slot within the rotor body, the at least one dovetail slot for receiving a dovetail section of a rotor blade, the at least one dovetail slot including: a pair of opposing, vertically aligned surfaces defining a radial opening; a pair of inclined bearing surfaces each continuous with one of the pair of opposing vertically aligned surfaces; a substantially planar inner surface opposing the radial opening; and a pair of bulbous surfaces each continuous with an end of the substantially planar inner surface and an end of one of the pair of inclined bearing surfaces, the pair of bulbous surfaces each having: a first section proximate the one of the pair of inclined bearing surfaces; and a second section continuous with the first section, the first section located a first distance from a middle point on a first reference line connecting the end of the one of the pair of inclined bearing surfaces and the end of the substantially planar inner surface, and the second section located a second distance from the middle point on the first reference line, the first distance being larger than the second distance.

A second aspect of the invention includes a method including: removing a rotor blade from a dovetail slot in a turbomachine rotor, the dovetail slot including: a pair of opposing, vertically aligned surfaces defining a radial opening; a pair of inclined bearing surfaces each continuous with one of the pair of opposing vertically aligned surfaces; a substantially planar inner surface opposing the radial opening; and a pair of rounded junctions each continuous with an end of the substantially planar inner surface and an end of one of the pair of inclined bearing surfaces; and machining the pair of rounded junctions to form a pair of bulbous surfaces each continuous with the end of the substantially planar inner surface and the end of one of the pair of inclined bearing surfaces, the pair of bulbous surfaces each having: a first section proximate the one of the pair of inclined bearing surfaces; and a second section continuous with the first section, the first section located a first distance from a middle point on a first reference line connecting the end of the one of the pair of inclined bearing surfaces and the end of the substantially planar inner surface, and the second section located a second distance from the middle point on the first reference line, the first distance being larger than the second distance.

A third aspect of the invention includes a turbomachine having: a stator; and a rotor substantially contained within the stator, the rotor having: a rotor body; and at least one dovetail slot within the rotor body, the at least one dovetail slot for receiving a dovetail section of a rotor blade, the at least one dovetail slot including: a pair of opposing, vertically aligned surfaces defining a radial opening; a pair of inclined bearing surfaces each continuous with one of the pair of opposing vertically aligned surfaces; a substantially planar inner surface opposing the radial opening; and a pair of bulbous surfaces each continuous with an end of the substantially planar inner surface and an end of one of the pair of inclined bearing surfaces, the pair of bulbous surfaces each having: a first section proximate the one of the pair of inclined bearing surfaces; and a second section continuous with the first section, the first section located a first distance from a middle point on a first reference line connecting the end of the one of the pair of inclined bearing surfaces and the end of the substantially planar inner surface, and the second section located a second distance from the middle point on the first reference line, the first distance being larger than the second distance.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
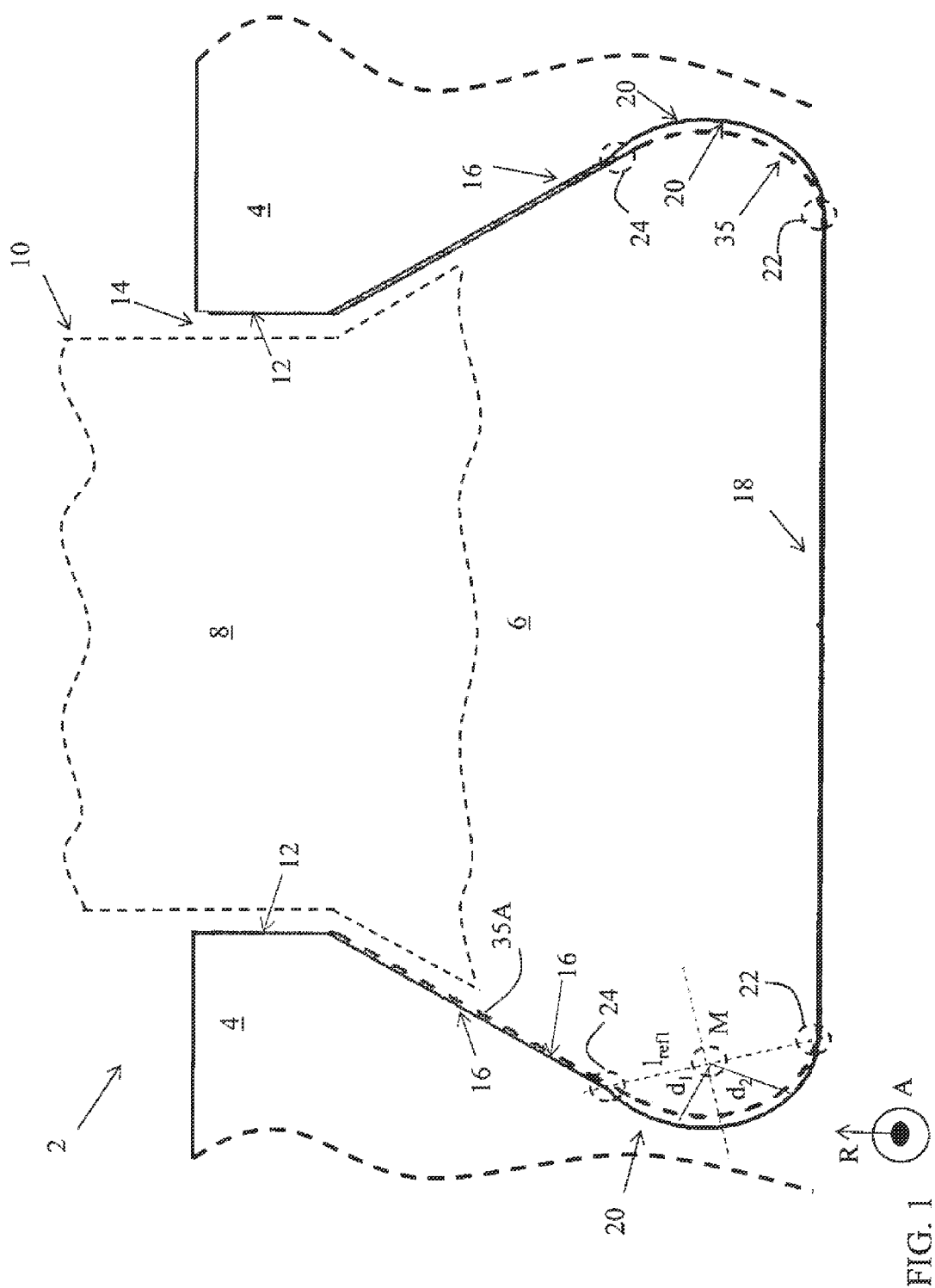
FIG. 1 shows a schematic depiction of a portion of a turbomachine rotor according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to turbomachines (e.g., turbines). More particularly, the subject matter relates to turbomachines such as gas turbines, and systems utilizing a turbomachine.

As described herein, during its operational lifetime, turbine rotors (along with other components) may be repaired and/or refurbished. Sometimes, repair/refurbishment involves removing blades from the rotor wheel, and replacing those blades with either rehabilitated or altogether new blades. However, during repair/refurbishment of blades, the rotor wheel can become damaged, and in some cases, is discarded. No current approach exists for preventing or remedying this damage.

Various embodiments of the invention include methods of machining a rotor wheel, along with the machined wheel, which overcome the deficiencies of the conventional approaches. Various embodiments include a method of removing a blade from a rotor wheel slot (or dovetail slot), and re-contouring the profile of the wheel slot to repair/prevent damage in the slot when a blade (either refurbished or replacement) is installed into the slot. Various other embodiments include a rotor having at least one dovetail slot with a pair of bulbous surfaces. The pair of bulbous surfaces can include a first section proximate the one of the pair of inclined bearing surfaces (also referred to in the art as "pressure faces" or "pressure surfaces") and a second section continuous with the first section. The first section is located a first distance ($d_1$) (e.g., along a first section arc) from a middle point on a first reference line connecting the end of the one of the pair of inclined bearing surfaces (radially outboard of the bulbous sections) and the end of the substantially planar inner surface (radially inboard of the bulbous sections), and the second section located a second distance ($d_2$) (e.g., along a second section arc continuous or tangent with, the first section arc) from the middle point on the first reference line, the first distance being larger than the second distance.

Various particular aspects of the invention include a turbomachine rotor having: a rotor body; and at least one dovetail slot within the rotor body, the at least one dovetail slot for receiving a dovetail section of a rotor blade, the at least one dovetail slot including: a pair of opposing, vertically aligned surfaces defining a radial opening; a pair of inclined bearing surfaces (also referred to in the art as "pressure faces" or "pressure surfaces") each continuous with one of the pair of opposing vertically aligned entry surfaces; a substantially planar inner surface opposing the radial opening; and a pair of bulbous surfaces each continuous with an end of the substantially planar inner surface and an end of one of the pair of inclined bearing surfaces, the pair of bulbous surfaces each having: a first section proximate the one of the pair of inclined bearing surfaces; and a second section continuous with the first section, the first section located a first distance ($d_1$) (e.g., along a first section arc) from a middle point on a first reference line connecting the end of the one of the pair of inclined bearing surfaces (radially outboard of the bulbous sections) and the end of the substantially planar inner surface (radially inboard of the bulbous sections), and the second section located a second distance ($d_2$) (e.g., along a second section arc continuous, or tangent with, the first section arc) from the middle point on the first reference line, the first distance being larger than the second distance.

Various additional particular embodiments of the invention include a method including: removing a rotor blade from a dovetail slot in a turbomachine rotor, the dovetail slot including: a pair of opposing, vertically aligned surfaces defining a radial opening; a pair of inclined bearing surfaces each continuous with one of the pair of opposing vertically aligned entry surfaces; a substantially planar inner surface opposing the radial opening; and a pair of rounded junctions each continuous with an end of the substantially planar inner surface and an end of one of the pair of inclined bearing surfaces; and machining the pair of rounded junctions to form a pair of bulbous surfaces each continuous with the end of the substantially planar inner surface and the end of one of the pair of inclined bearing surfaces, the pair of bulbous surfaces each having: a first section proximate the one of the pair of inclined bearing surfaces; and a second section continuous with the first section, the first section located a first distance ($d_1$) (e.g., along a first section arc) from a middle point on a first reference line connecting the end of the one of the pair of inclined bearing surfaces (radially outboard of the bulbous sections) and the end of the substantially planar inner surface (radially inboard of the bulbous sections), and the second section located a second distance ($d_2$) (e.g., along a second section arc continuous, or tangent with, the first section arc) from the middle point on the first reference line, the first distance being larger than the second distance.

Even further various particular embodiments of the invention include a turbomachine having: a stator; and a rotor substantially contained within the stator, the rotor having: a rotor body; and at least one dovetail slot within the rotor body, the at least one dovetail slot for receiving a dovetail section of a rotor blade, the at least one dovetail slot including: a pair of opposing, vertically aligned surfaces defining a radial opening; a pair of inclined bearing surfaces each continuous with one of the pair of opposing vertically aligned entry surfaces; a substantially planar inner surface opposing the radial opening; and a pair of bulbous surfaces each continuous with an end of the substantially planar inner surface and an end of one of the pair of inclined bearing surfaces, the pair of bulbous surfaces each having: a first section proximate the one of the pair of inclined bearing surfaces; and a second section continuous with the first section, the first section located a first distance ($d_1$) (e.g., along a first section arc) from a middle point on a first reference line connecting the end of the one of the pair of inclined bearing surfaces (radially outboard of the bulbous sections) and the end of the substantially planar inner surface (radially inboard of the bulbous sections), and the second section located a second distance ($d_2$) (e.g., along a second section arc continuous, or tangent with, the first section arc) from the middle point on the first reference line, the first distance being larger than the second distance.

Figure 2:
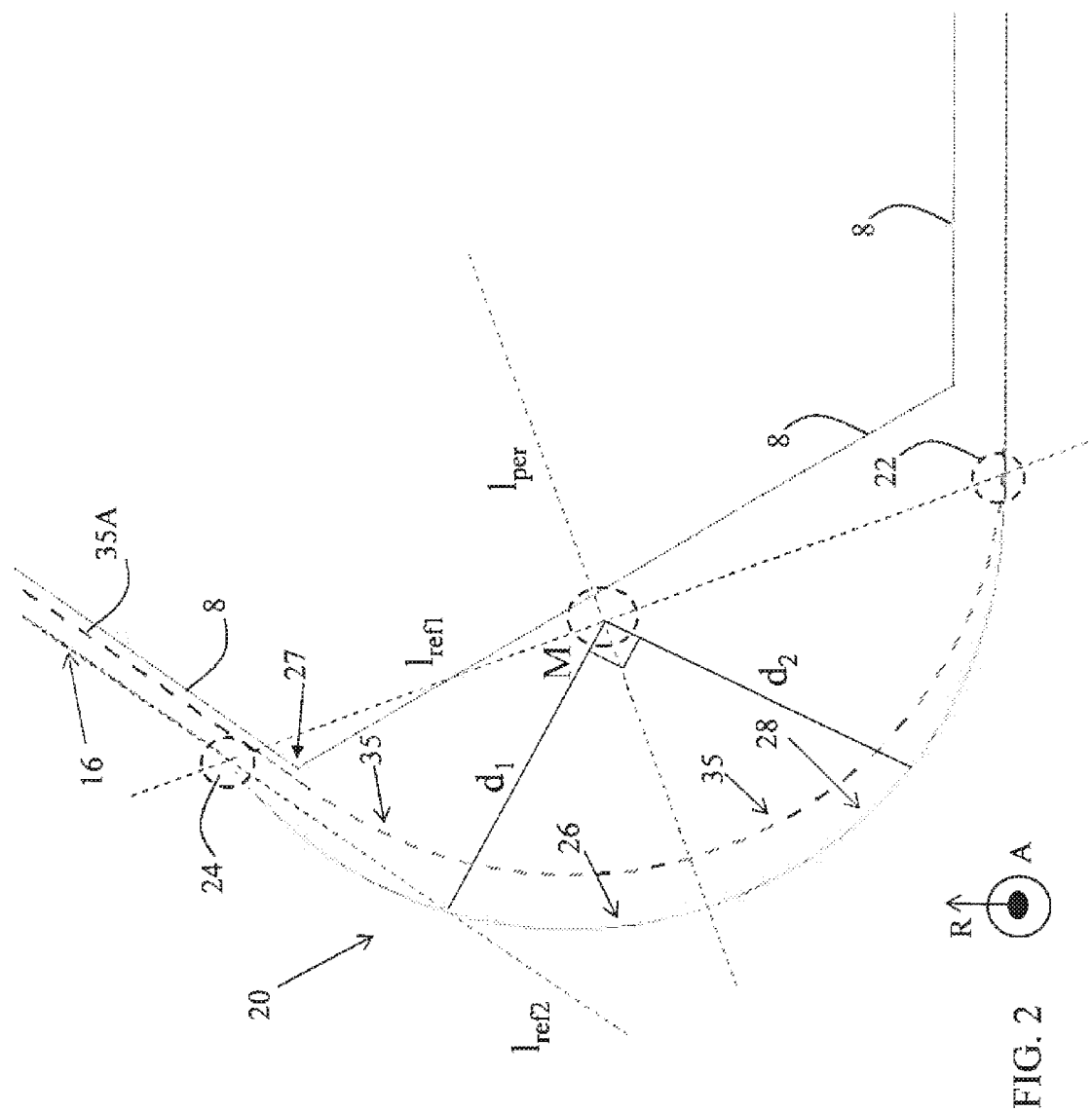
FIG. 2 shows a close-up view of a portion of a turbomachine dovetail slot according to various embodiments of the invention.

Turning to FIG. 1, schematic depiction of a portion of a turbomachine rotor 2 is shown according to various embodiments of the invention. FIG. 2 illustrates a close-up schematic depiction of a portion of the rotor of FIG. 1. Some components are more clearly illustrated in FIG. 2 due to its close-up depiction.

It is understood that in various embodiments, the turbomachine rotor 2 represents a refurbished or otherwise repaired rotor. Various features of the turbomachine rotor 2 are a product of machining performed during service or maintenance of an originally commissioned turbomachine rotor. As will be described herein, that machining process performed according to various embodiments of the invention can enhance a conventional turbomachine rotor by modifying the dovetail slot profile of at least one dovetail slot in the rotor's wheel (or, body).

As shown in FIGS. 1-2, the turbomachine rotor 2 can include a rotor body (e.g., a rotor wheel) 4 and at least one dovetail slot (or simply, dovetail slot) 6 within the rotor body 4. The at least one dovetail slot 6 can be one of a set of dovetail slots 6 located circumferentially about the axis of rotation (A) of the rotor body 4. The dovetail slots 6 are for receiving a dovetail section 8 of a rotor blade 10 (shown in phantom), and for retaining that rotor blade 10 (via interaction with the dovetail section 8) during operation of a turbomachine including the rotor 2. As shown, the dovetail slot 6 includes a pair of opposing, vertically aligned surfaces 12 defining a radial opening 14 (obstructed by depiction of dovetail section 8). The dovetail slot 6 can further include a pair of inclined bearing surfaces 16 (also referred to in the art as "pressure faces" or "pressure surfaces") each continuous with one of the pair of opposing vertically aligned entry surfaces 12. The inclined bearing surfaces 16 can interact with the dovetail section 8 and bear some of the circumferential and radial-based loads from dovetail section 8 as the rotor 2 rotates during operation. As will be described further herein, the inclined bearing surfaces 16 can be recessed from a precursor (or, original or existing) inclined bearing surface 35A to form recessed inclined bearing surfaces 16. However, in various embodiments, and as described herein, the inclined bearing surfaces 16 can be formed after the formation of the herein-described bulbous surfaces).

With continuing reference to FIGS. 1-2, the dovetail slot 6 can further include a substantially planar inner surface 18 opposing the radial opening 14. The planar inner surface 18 can define a radially inner surface of the dovetail slot 6 (where the radial direction is indicated by the letter (R) in the displayed key.

In contrast to conventional dovetail slots, the dovetail slot 6 according to various embodiments of the invention can include: a pair of bulbous surfaces 20 each continuous with an end 22 of the substantially planar inner surface 18 and an end 24 of one of the pair of inclined bearing surfaces 16. The pair of bulbous surfaces 20 can each have a first section 26 proximate the one of the pair of inclined bearing surfaces 16, and a second section 28 continuous with the first section 26. The first section 26 is located a first distance ($d_1$) from a middle point (M) on a first reference line ($l_{ref1}$) connecting the end 24 of the one of the pair of inclined bearing surfaces 16 and the end 22 of the substantially planar inner surface 18. The second section 28 is located a second distance ($d_2$) from the middle point (M) on a first reference line ($l_{ref1}$), as shown at the intersection of the first reference line ($l_{ref1}$) and a perpendicular middle intersecting line ($l_{per}$). In various embodiments the first distance ($d_1$) is distinct from the second distance ($d_2$). In some cases, as shown in FIGS. 1-2, the first distance ($d_1$) is greater than the second distance ($d_2$). However, in alternative embodiments, the second distance ($d_2$) is greater than the first distance ($d_1$). In any case, however, the first distance ($d_1$) is distinct from the second distance ($d_2$). As shown in FIG. 2, ($d_1$) and ($d_2$) are perpendicular with respect to one another.

It is understood that distances ($d_1$) and ($d_2$) are merely illustrative of the nature of the bulbous surface 20. A plurality of distance-based reference lines could be used to characterize the bulbous surface 20. That is, the bulbous surface 20 can include a non-uniform profile with a plurality of distinct distance measurements from the middle point (M), including, e.g., three, four, five or more distinct sections each located a distinct distance from the middle point (M).

Described differently, the first section 26 of each of the pair of bulbous surfaces 20 extends circumferentially (and radially) beyond a second reference line ($l_{ref1}$) extending from the end 24 of the one of the pair of inclined bearing surfaces 16 away from the radial opening 14. In any case, forming the pair of bulbous surfaces 20 expands the circumferential width of the base (or radially inner portion) of a conventional dovetail slot 35 (shown in phantom for comparative purposes). As described herein, the inclined bearing surfaces (also referred to as pressure faces or pressure surfaces) 35A of the conventional dovetail slot 35 can also be machined (e.g., after the forming of the pair of bulbous surfaces 20) to form the inclined bearing surfaces 16 shown and described according to various embodiments of the invention. As shown and described herein, machining of the conventional inclined bearing surfaces 35A to form the recessed inclined bearing surfaces 16 can include recessing the end 24 of one of the pair of inclined bearing surfaces 16 such that the end 24 is radially outward of a radially outer section 27 of the dovetail 8 (section 27 denoting a corner between two sides of the dovetail 8). Recessing the inclined bearing surface 16 in this manner can allow for reduction in contact stresses between the dovetail 8 and the slot 6.

In some cases, the pair of bulbous surfaces 20 can reduce contact stresses between the dovetail section 8 of the rotor blade 10 and the dovetail slot 6, e.g., proximate the junction of each bulbous surface 20 and each one of the pair of inclined bearing surfaces 16. Further, the pair of bulbous surfaces 20 can reduce acute corner stresses in the rotor body 4, e.g., between the dovetail section 8 of the rotor blade 10 and the dovetail slot 6 in locations proximate the junction of each bulbous surface 20 and each one of the pair of inclined bearing surfaces 16. Even further, the pair of bulbous surfaces 20 can ease (e.g., make more efficient) milling of the pair of existing inclined surfaces 35A of the dovetail slot 6 in a subsequent milling process, e.g., after forming the pair of bulbous surfaces 20. In this sense, formation of the pair of bulbous surfaces 20 modifies the angle at which the subsequent milling process can be performed, thereby easing (making more efficient) the milling of the pair of existing inclined surfaces 35A. As described herein, one process according to various embodiments of the invention can include milling the pair of existing inclined surfaces 35A to form the recessed inclined surfaces 16, after forming of the pair of bulbous surfaces 20.

Figure 3:
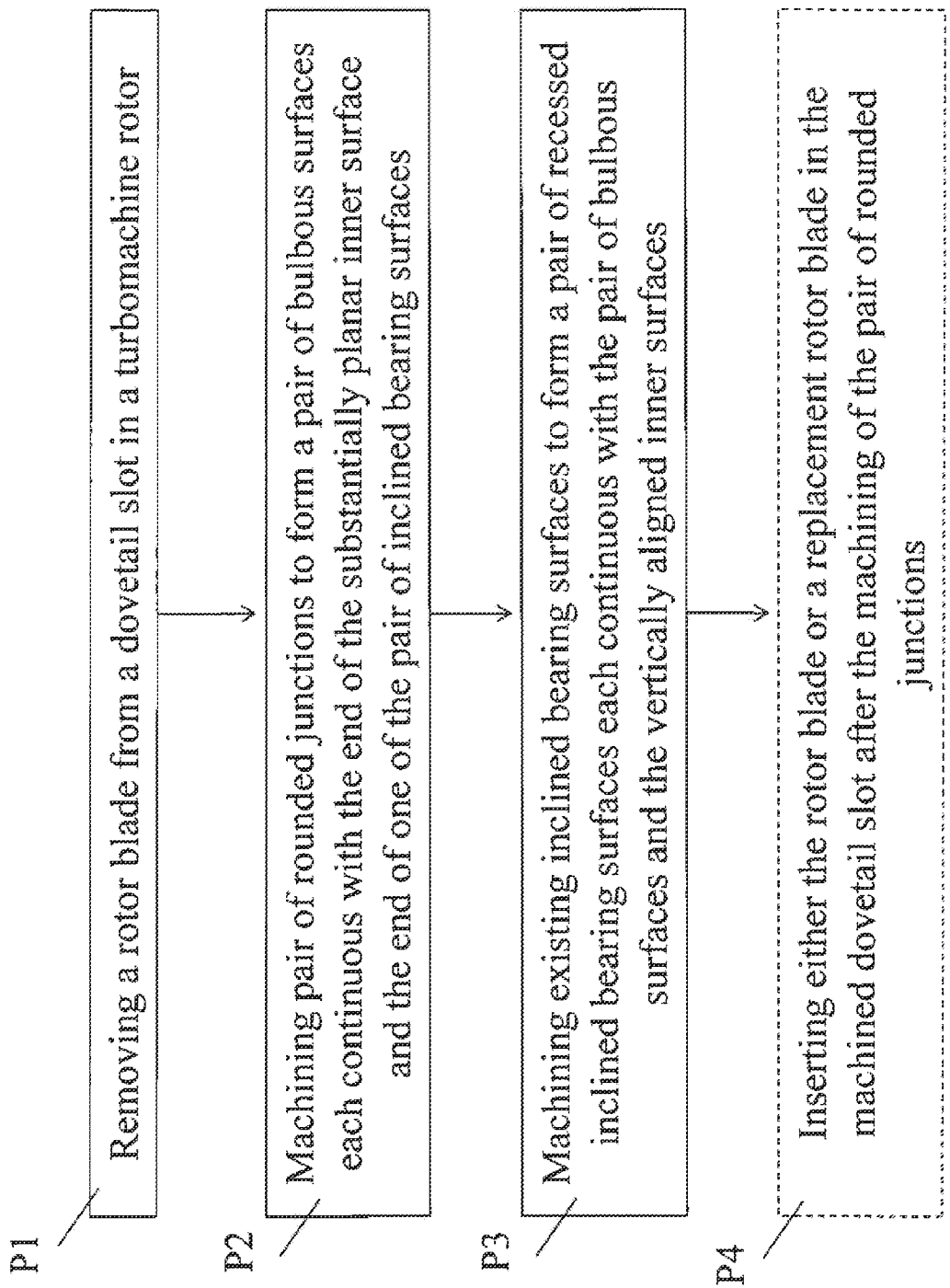
FIG. 3 shows a flow diagram illustrating a process according to various embodiments of the invention.

Various embodiments of the invention relate to a method of machining a turbomachine, in particular, a turbomachine dovetail slot (e.g., dovetail slot 6). FIG. 3 shows an illustrative flow diagram including processes in a method of machining a turbomachine dovetail slot. As shown, the method can include:

Process P1: removing a rotor blade from a dovetail slot in a turbomachine rotor. The dovetail slot can include: a pair of opposing, vertically aligned surfaces defining a radial opening; a pair of inclined bearing surfaces each continuous with one of the pair of opposing vertically aligned entry surfaces; a substantially planar inner surface opposing the radial opening; and a pair of rounded junctions (e.g., as shown in the conventional dovetail slot 35), each continuous with an end of the substantially planar inner surface and an end of one of the pair of inclined bearing surfaces;

Process P2: machining the pair of rounded junctions to form a pair of bulbous surfaces each continuous with the end of the substantially planar inner surface and the end of one of the pair of inclined bearing surfaces. The pair of bulbous surfaces can each have: a first section proximate the one of the pair of inclined bearing surfaces; and a second section continuous with the first section, wherein the first section is located a first distance from a middle point on a first reference line connecting the end of the one of the pair of inclined bearing surfaces and the end of the substantially planar inner surface, and the second section located a second distance from the middle point on the first reference line, the first distance being larger than the second distance. In some cases, the machining includes using a rotary-mounted cutter (e.g., a machine-held drill mount with cutter) having a non-uniform cutting radius. In this case, the rotary-mounted cutter can form two distinct radii in the bulbous surfaces. In some cases, the machining includes using a rotary-mounted cutter to form a first section of each of the pair of bulbous surfaces which extends circumferentially beyond a second reference line extending from the end of the one of the pair of inclined bearing surfaces away from the radial opening;

Process P3: machining existing inclined bearing surfaces to form a pair of recessed inclined bearing surfaces, each continuous with the pair of bulbous surfaces and the vertically aligned inner surfaces; and Process P4 (optional, in some embodiments): inserting either the rotor blade or a replacement rotor blade in the machined dovetail slot after the machining the pair of rounded junctions.

It is understood that various embodiments of the invention describe processes of "forming" surfaces, e.g., a slot in a turbomachine rotor. In some cases, the term "machining" is used to describe forming particular portions of a surface. In some cases, "machining" and/or "forming" can refer to using conventional techniques such as: milling and/or grinding, local broaching, shaper machining, wire electrical-discharge-machining (EDM), plunge EDM, and/or air-cooled milling (e.g., ultra-high speed air-cooled milling). It is understood that these are only some of the various techniques available to form the various dovetail slots shown and described herein.

Figure 4:
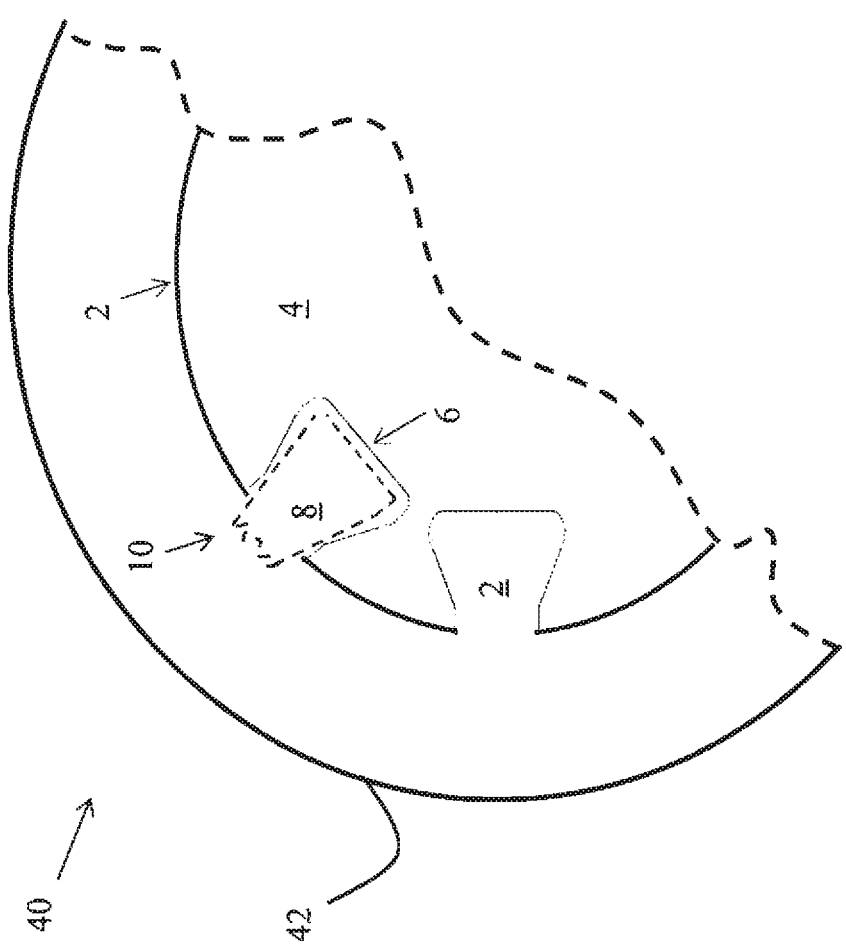
FIG. 4 shows a portion of a turbomachine, including a turbomachine rotor according to various embodiments of the invention.

FIG. 4 shows a schematic depiction of a portion of a turbomachine 40 according to various embodiments of the invention. It is understood that common numbering between figures may represent common elements across those figures. In some embodiments, the turbomachine 40 includes a gas turbine compressor having: a stator 42; and a rotor 2 substantially contained within the stator 42. The rotor 2 can have a rotor body 4 and at least one dovetail slot 6 within the rotor body 4, the at least one dovetail slot for receiving a dovetail section 8 of a rotor blade 10 (shown in phantom). Aspects of the dovetail slot 6 are described with reference to FIGS. 1-2 and the various embodiments of the invention herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of refurbishing a turbomachine rotor comprising:
    providing a rotor body having
        at least one dovetail slot within the rotor body, the at least one dovetail slot for receiving a dovetail section of a rotor blade, the at least one dovetail slot including:
        a pair of opposing, vertically aligned surfaces defining a radial opening;
        a pair of inclined bearing surfaces each continuous with one of the pair of opposing vertically aligned surfaces;
        a substantially planar inner surface opposing the radial opening; and
    machining a pair of rounded junctions to form a pair of bulbous surfaces each continuous with an end of the substantially planar inner surface and an end of one of the pair of inclined bearing surfaces, the pair of bulbous surfaces each having:
        a first section proximate the one of the pair of inclined bearing surfaces; and
        a second section continuous with the first section; and
    machining the pair of inclined bearing surfaces to form recessed inclined bearing surfaces after the machining of the pair of rounded junctions to form the pair of bulbous surfaces to form a refurbished dovetail slot.

2. The method of claim 1, further comprising inserting a rotor blade having a dovetail section into the refurbished dovetail slot, the dovetail section residing substantially within the refurbished dovetail slot.

3. The method of claim 2, wherein the pair of bulbous surfaces reduces contact stresses between the dovetail section and the refurbished dovetail slot.

4. The method of claim 1, wherein the pair of bulbous surfaces reduces acute corner stress in the rotor body.

5. The method of claim 1, wherein the first section of each of the pair of bulbous surfaces extends circumferentially beyond a second reference line extending from the end of the one of the pair of inclined bearing surfaces away from the radial opening.

6. A method comprising:
    removing a rotor blade from a dovetail slot in a turbomachine rotor, the dovetail slot including:
    a pair of opposing, vertically aligned surfaces defining a radial opening;
    a pair of inclined bearing surfaces each continuous with one of the pair of opposing vertically aligned surfaces;
    a substantially planar inner surface opposing the radial opening; and
    a pair of rounded junctions each continuous with an end of the substantially planar inner surface and an end of one of the pair of inclined bearing surfaces; and
    machining the pair of rounded junctions to form a pair of bulbous surfaces each continuous with the end of the substantially planar inner surface and the end of one of the pair of inclined bearing surfaces, the pair of bulbous surfaces each having:

a first section proximate the one of the pair of inclined bearing surfaces; and a second section continuous with the first section, the first section located a first distance from a middle point on a first reference line connecting the end of the one of the pair of inclined bearing surfaces and the end of the substantially planar inner surface, and the second section located a second distance from the middle point on the first reference line, the first distance being larger than the second distance; and machining the pair of inclined bearing surfaces to form recessed inclined bearing surfaces after the machining of the pair of rounded junctions to form the pair of bulbous surfaces.

7. The method of claim 6, further comprising inserting either the rotor blade or a replacement rotor blade in the machined dovetail slot after the machining of the pair of rounded junctions and the machining of the pair of inclined bearing surfaces.

8. The method of claim 6, wherein the machining includes using a rotary-mounted cutter having a non-uniform cutting radius.

9. The method of claim 6, wherein the machining includes using a rotary-mounted cutter to form a first section of each of the pair of bulbous surfaces which extends circumferentially beyond a second reference line extending from the end of the one of the pair of inclined bearing surfaces away from the radial opening.

10. A method of refurbishing a turbomachine having a stator; and a rotor substantially contained within the stator, the rotor having:

a rotor body; and at least one dovetail slot within the rotor body, the at least one dovetail slot for receiving a dovetail section of a rotor blade, the at least one dovetail slot including:

a pair of opposing, vertically aligned surfaces defining a radial opening;

a pair of inclined bearing surfaces each continuous with one of the pair of opposing vertically aligned surfaces; and a substantially planar inner surface opposing the radial opening, method comprising;

machining a pair of rounded junctions to form a pair of bulbous surfaces each continuous with an end of the substantially planar inner surface and an end of one of the pair of inclined bearing surfaces, the pair of bulbous surfaces each having:

a first section proximate the one of the pair of inclined bearing surfaces; and a second section continuous with the first section, and machining the pair of inclined bearing surfaces to form recessed inclined bearing surfaces after the machining of the pair of rounded junctions to form the pair of bulbous surfaces to form a refurbished dovetail slot.

11. The method of claim 10, further comprising inserting a rotor blade having a dovetail section into the refurbished dovetail slot, the dovetail section residing substantially within the refurbished dovetail slot.

12. The method of claim 11, wherein the pair of bulbous surfaces reduces contact stresses between the dovetail section and the refurbished dovetail slot.

13. The method of claim 10, wherein the pair of bulbous surfaces reduces acute corner stress in the rotor body.

14. The method of claim 10, wherein the first section of each of the pair of bulbous surfaces extends circumferentially beyond a second reference line extending from the end of the one of the pair of inclined bearing surfaces away from the radial opening.

* * * * *